United States Patent [19]

Hosaka

[11] Patent Number: 4,682,667
[45] Date of Patent: Jul. 28, 1987

[54] POWER TRAIN CONTROL METHOD FOR SLIP PREVENTION

[75] Inventor: Akio Hosaka, Yokohama, Japan

[73] Assignee: Nissan Motor Co., Ltd., Yokohama, Japan

[21] Appl. No.: 680,881

[22] Filed: Dec. 12, 1984

[30] Foreign Application Priority Data

Dec. 14, 1983 [JP] Japan ................. 58-234143

[51] Int. Cl.⁴ ............................. B60K 31/00
[52] U.S. Cl. ................. 180/197; 123/333; 364/426
[58] Field of Search ............... 180/197, 76; 123/198 DB, 332, 333; 364/426, 431.01

[56] References Cited

U.S. PATENT DOCUMENTS

| | | | |
|---|---|---|---|
| 3,217,826 | 11/1965 | Carter et al. | 180/197 |
| 3,752,249 | 8/1973 | Gelenius et al. | 180/197 |
| 3,825,902 | 7/1974 | Brown et al. | 340/172.5 |
| 3,905,025 | 9/1975 | Davis et al. | 340/172.5 |
| 3,938,612 | 2/1976 | Boudeville et al. | 180/197 |
| 4,346,774 | 8/1982 | Hirota et al. | 180/197 X |
| 4,355,360 | 10/1982 | Asano et al. | 364/431.11 |
| 4,410,947 | 10/1983 | Strong et al. | 180/197 X |
| 4,554,990 | 11/1985 | Kamiya et al. | 180/197 |

FOREIGN PATENT DOCUMENTS

| | | | |
|---|---|---|---|
| 53-12447 | 2/1978 | Japan | |
| 54-58116 | 5/1979 | Japan | |
| 55-32918 | 3/1980 | Japan | |
| 55-125334 | 9/1980 | Japan | |
| 55-160137 | 12/1980 | Japan | |
| 56-24255 | 3/1981 | Japan | |
| 56-24256 | 3/1981 | Japan | |
| 56-75222 | 6/1981 | Japan | 180/197 |
| 57-33253 | 2/1982 | Japan | |
| 57-47056 | 3/1982 | Japan | |
| 57-185501 | 11/1982 | Japan | |
| 58-13140 | 1/1983 | Japan | |
| 58-38347 | 3/1983 | Japan | |
| 58-25853 | 5/1983 | Japan | |

*Primary Examiner*—John J. Love
*Assistant Examiner*—Charles R. Watts
*Attorney, Agent, or Firm*—Schwartz, Jeffery, Schwaab, Mack, Blumenthal & Evans

[57] ABSTRACT

A method of controlling a power train which drives a driving wheel of an automotive vehicle is disclosed. In the method, a slip rate is determined based on a difference between a ground speed of the vehicle and a peripheral revolution speed of a driving wheel and the engine output is increased or decreased so as to keep the slip rate at a predetermined target slip rate.

2 Claims, 9 Drawing Figures

POWER TRAIN CONTROL METHOD FOR SLIP PREVENTION

BACKGROUND OF THE INVENTION

The present invention relates to a method of controlling a power train such that a slip is prevented at start-up and acceleration of an automotive vehicle on a slippery road.

According to a conventional method of controlling a power train so as to prevent slip from occurring, as disclosed in Laid-open Japanese Patent Application No. 58-38347, slip is detected based on a difference between an average between revolution speeds of two front wheels and that between revolution speeds of two rear wheels (driving wheels), and the supply of fuel to an engine, which is a power source of the power train, is discontinued when the slip is detected in order to prevent the slip from occurring.

Referring to FIG. 8, there is shown how a driving force of a driving wheel varies as a function of a variation in a slip rate S of the driving wheel for different road conditions including a dry road, a wet road and a snow-covered road. The slip rate S is expressed as $$S = (PSD - GSV)/PSD$$

where:
PSD is an abbreviation for the peripheral speed of a driving wheel,
GSV is an abbreviation for the ground speed of a vehicle.

A driving force which is applicable to each driving wheel by a power train differs and is determined by the road surface condition and a slip rate S. That is, the driving force decreases as the road surface condition which the vehicle runs on changes from dry to wet and then to snow, and the driving force peaks and becomes maximum at a predetermined slip rate S1 for all of the road conditions and becomes smaller and smaller as the deviation increases from this slip rate S1.

The conventional method poses a problem which is attributed to the face that slip is prevented by causing a reduction in an output torque of an engine upon detecting slip when a difference between an average of the revolution speeds of the two front wheels (ground speed of vehicle or GSV) and that of the revolution speeds of the two rear driving wheels (peripheral speed of driving wheel or PSD) exceeds a predetermined value. In other words, what is effected by this conventional controlling method is to cause the slip rate S to decrease only when the peripheral speed of the driving wheels is higher than the average of the revolution speeds of the front wheels (non-driving wheels). Again referring to FIG. 8, this conventional control does not allow the slip rate to be increased for example when the slip rate is smaller than the predetermined slip rate S1, where the driving force becomes a maximum. The problem is therefore that when the vehicle has to run with slip rate falling in a range smaller than the predetermined slip rate S1, the vehicle is forced to be driven with an insufficient driving force, thus failing to generate a sufficient driving force for quick starting of the vehicle at start-up, failing to give a sufficient degree of acceleration, and failing to make full use of the maximum output which can be generated by the power train.

SUMMARY OF THE INVENTION

An object of the present invention is to provide a method of controlling a power train for slip-prevention wherein the output torque of the power train is increased/decreased to cause the slip rate to always be adjusted to a predetermined slip rate where the maximum driving force is given.

According to the present invention there is provided a method of controlling an automotive vehicle having a driving wheel driven by a power train and a non-driving wheel, the power train including an engine and a transmission, the method comprising the steps of:

detecting a peripheral speed of the driving wheel and generating a first peripheral speed indicative signal indicative of said peripheral speed of the driving wheel;

detecting a peripheral speed of the non-driving wheel and generating a second peripheral speed indicative signal indicative of said peripheral speed of the non-driving wheel;

determining a ratio of a difference between said first and second peripheral speed indicative signals to said first peripheral speed indicative signal and generating a slip rate indicative signal indicative of the value of said determined ratio;

determining from the slip rate indicative signal a deviation of the value of said determined ratio from a predetermined target slip rate value and generating a deviation indicative signal indicative of said determined deviation; and controlling the power train in response to said deviation indicative signal such that an output torque produced by the power train is varied in a direction as to decrease said deviation indicative signal toward zero whereby said indicative value of said slip rate indicative signal is kept at said predetermined target slip rate value.

DETAILED DESCRIPTION OF THE INVENTION

Hereinafter, the present invention is described in detail based on an illustrated embodiment.

Figure 1:
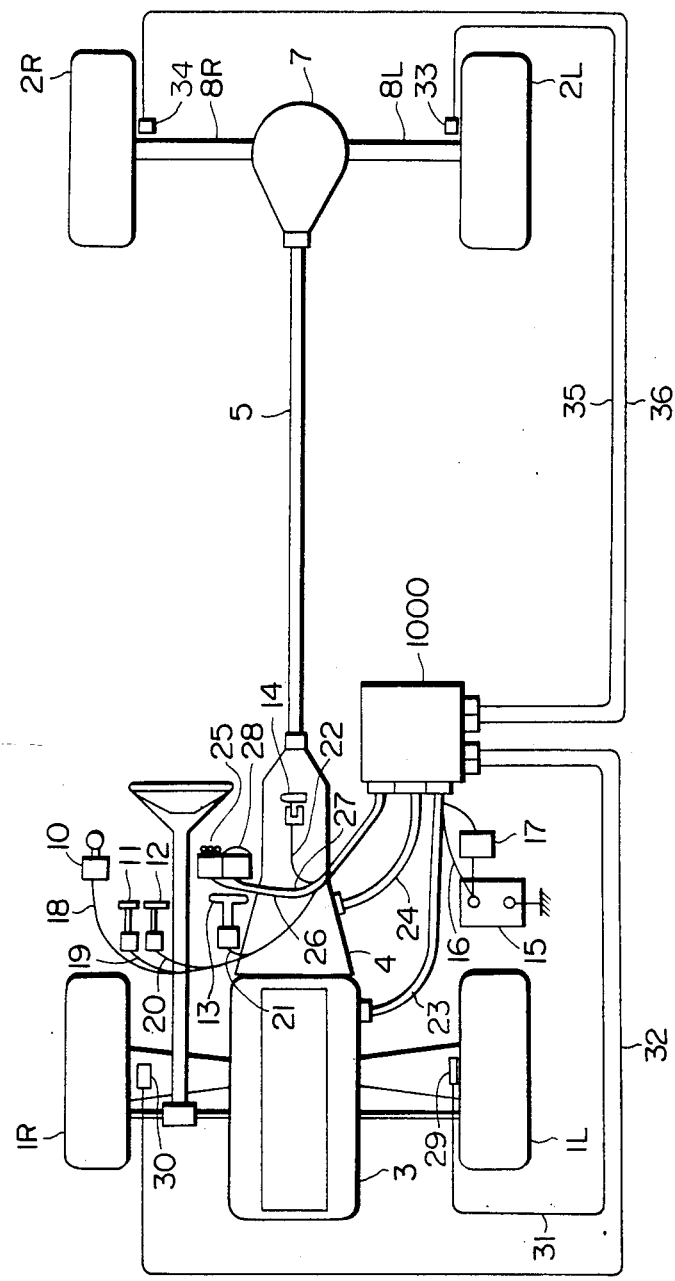
FIG. 1 is a plan view of an automotive vehicle illustrating a control system for carrying out a method according to the present invention.

Referring to FIG. 1, there is shown one example of a control system for carrying out a method according to the present invention together with a power train of an automotive vehicle which is to be controlled. In the Figure, 1L, 1R designate left and right front wheels, respectively, 2L, 2R designate left and right rear wheels, 3 designates an engine, 4 designates a transmission (automatic transmission), 5 designates a propeller shaft, 7 designates a differential gear, 8L, 8R designate left and right rear axles. The front wheels 1L, 1R designate change direction wheels which are controlled by a steering wheel 9 to change direction of the automotive vehicle. The rear wheels 2L, 2R are driving wheels of the automotive vehicle which receive the output of the engine 3 that is delivered via the transmission 4, propeller shaft 5, differential gear 7 and axles 8L, 8R.

The start, operation and stop of the engine 3 is controlled by an ignition switch 10. The engine 3 can increase its output as the accelerator pedal 11 is depressed. The output of the engine 3 is delivered in the above mentioned delivery path to the rear wheels 2L, 2R, enabling the vehicle to run. The vehicle can be stopped by depressing a brake pedal 12 and parked by manipulating a parking brake 13.

The transmission 4, which forms together with the engine 3 a power train to be controlled by the method according to the present invention, is rendered to establish a selected power delivery path in response to a manipulated position assumed by a select lever 14, such as a parking (P) range, a reverse (R) range, a neutral (N) range, a forward automatic drive (D) range, a manual second (II) brake range or a manual first (I) brake range and delivers the power from the engine 3 to the propeller shaft 5 with a selected gear position in a selected one of the drive ranges R, D, II and I.

The power train control system for carrying out the method according to the present invention comprises a control unit 1000 which is common to the engine 3 and the transmission 4. This control unit is always supplied via an electric path 16 with an electric power which serves as a direct continuously connected electric power source from a vehicle battery 15 and it operates on an electric power from the vehicle battery 15 which is supplied thereto as a main power source via a power source relay 17 that is closed when the ignition switch 10 is turned ON. Although they are described later, those signal are fed to the control unit 1000. They include a signal from the ignition switch 10 via an electric path 18, a signal from the accelerator pedal 11 via an electric path 19, a signal from the brake pedal 12 via an electric path 20, a signal from the parking brake lever 13 via an electric path 21, a signal from the select lever 14 via an electric path 22, signals indicative of a crank angle of the engine 3, a crankshaft torque, an intake air flow rate and a temperature via a wire harness 23, and signals indicative of an output shaft revolution speed of the transmission 4 and an output shaft torque thereof via a wire harness 24. In addition to these input signals, signals related to revolution speeds of the front left and right wheels 1l, 1R are fed from revolution speed sensors 29, 30 via electric paths 31, 32 to the control unit 1000, respectively, and signals related to revolution speeds of the rear left and right wheels 2L, 2R are fed from revolution speed sensors 33, 34 from revolution speed sensors via electric paths 35, 36 to the control unit 1000. Based on these input signals arithmetic operations are performed and the results are fed via the wire harnesses 23, 24 to the engine 3 and the transmission 4, respectively, thereby to control them. The control unit 1000 is also supplied via an electric path 26 with data input signals from a data input device 25 manually operable by a driver, alters its operation mode depending on these data input signals and feeds various kinds of data via an electric path 27 to a display 28 where the data are displayed.

Figure 2:
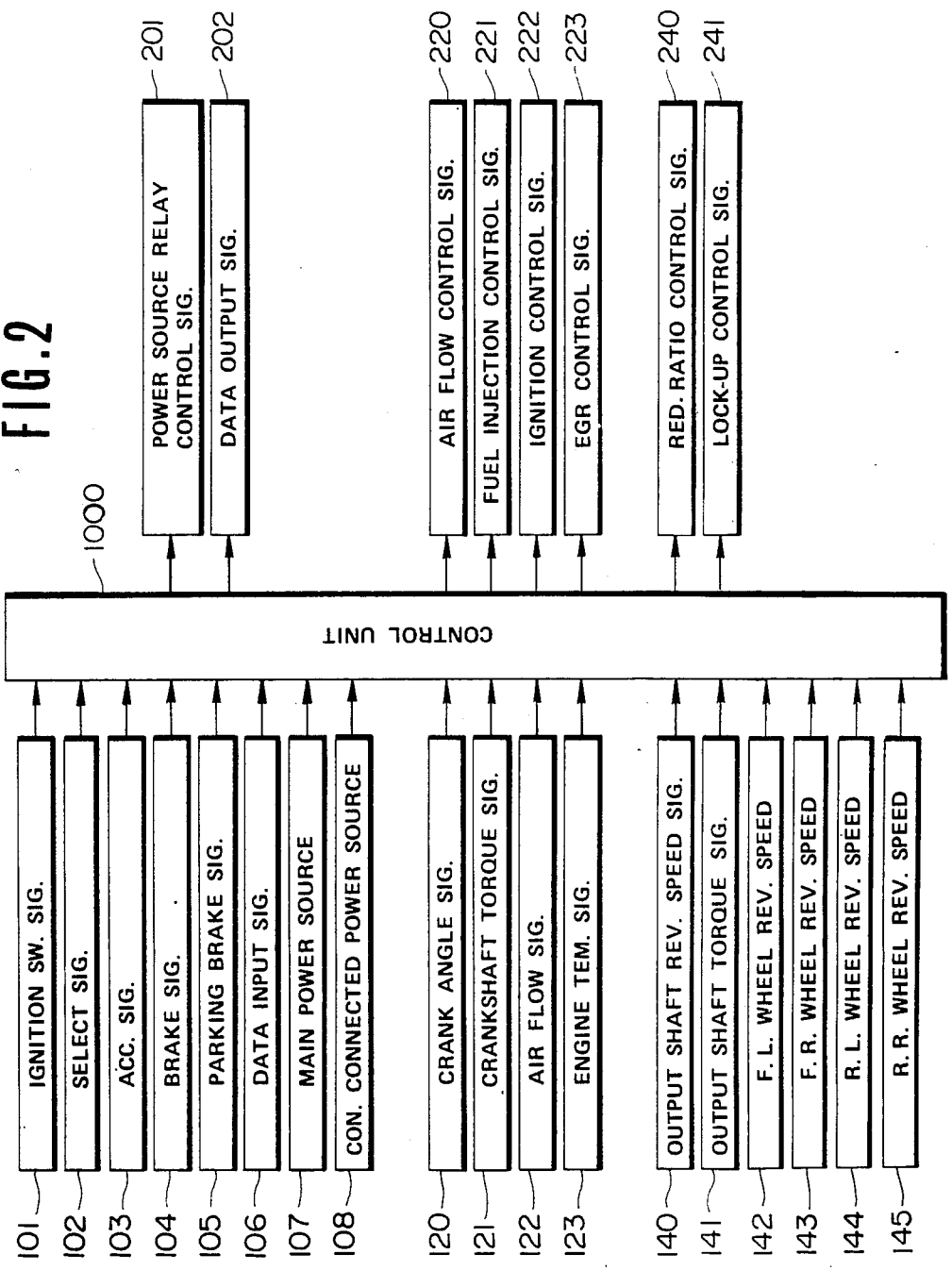
FIG. 2 is a block diagram illustrating a control unit with its various input and output signals.

Referring to FIG. 2, these input and output signals to and from the control unit 1000 are described in detail one after another. Among the input signals, an ignition switch signal 101 is indicative of which one of operation positions the ignition switch 10 assumes including a LOCK position, an OFF position, an ACCESSORY position, an ON position and a START position, and it is fed to the control unit 1000 via the electric path 18. Since the functions when the ignition switch 10 assumes these operation positions are well know, the description is omitted. A select signal 102 is indicative of which one of the before mentioned drive ranges P, R, N, D, II, I is selected via the electric path 28. An accelerator signal 103 which is a voltage signal variable in proportion to the depression degree of the accelerator pedal 11 is obtained by a potentiometer and fed to the control unit 1000 via the electric path 19. A brake signal 104 which is a voltage signal variable in proportion to the depression degree of the brake pedal 12 is obtained by a potentiometer and the like and fed to the control unit 1000 via the electric path 20. A parking brake signal 105 is obtained by a potentiometer and the like that is movable with the parking brake lever 13, which signal is a voltage signal variable in proportion to an operating position of the parking brake lever 13 and fed to the control unit 1000 via the electric path 21. Instead, the brake signal 104 and the parking brake signal 105 may be obtained by pressure sensors, each responsive to a bias force (a braking force) of a brake element. The signals 103, 104 and 105, although they were described previously as analog signals, may take the digital form by using encoders and the like.

A data input signal 106 is a signal from a key board of the data input device 25 or a switch and fed to the control unit 1000 via the electric path 26. The data input signal 106 specifies one of operation modes of the control unit 1000, for example a control operation mode and a self-checking mode or a power mode and a fuel economy mode. Such data input signal 106 is found in Laid-open Japanese Patent Application 58-13140. The main power source 107 is fed to the control unit 1000 via the power source relay 17 from the vehicle battery 15. The continuously connected power source 108 is always fed to the control unit 1000 via the electric path 16 from the battery 15.

A crank angle signal 120 is a pulse signal which is generated each time after the engine crankshaft has turned through a predetermined angular angle, which signal is fed to the control unit 1000 via the wire harness 23. This signal is generated by a photoelectric detector which detects a light passing through a slit plate, i.e., a disc rotatable with the crankshaft and formed with equiangularly distant slits. A crankshaft torque signal 121 is a voltage signal variable in proportion to the torque impressed on the crankshaft, the torque being detected using the piezoelectric effect. This signal is fed to the control unit 1000 via the wire harness 23. This signal 121 can be obtained by a torque sensor which is described in Laid-open Japanese Patent Application No. 53-12447. The air flow signal 122 is a signal variable in inverse proportion to the intake air flow rate admitted to the engine, and it is fed to the control unit 1000 via the wire harness 32. This signal is obtained by an air flow meter usually used in a fuel injection type engine. An engine temperature signal 123 is a signal variable in proportion to a coolant temperature of the engine 3, which signal is fed to the control unit 1000 via the wire harness 23. This signal is obtained by a thermistor which is sensitive to the temperature of an engine coolant.

All of the above mentioned input signals except the crankshaft torque signal 121 can be easily obtained in the manner as described in Laid-open Japanese Patent Application No. 57-185501.

An output shaft revolution speed signal 140 is a signal variable in proportion to the revolution speed of the output shaft of the transmission 4, which signal is fed to the control unit 1000 via a wire harness 24. This signal can be obtained by computing on a cycle or a frequency of a pulse signal that is generated by a similar means used to generate the crank angle signal 120. The output shaft torque signal 141 is a voltage signal which is proportional to the output shaft torque of the transmission 4, which signal is fed to the control unit 1000 via the wire harness 24. This signal can be generated by a similar torque sensor used to generate the crankshaft torque signal 121.

The front left wheel revolution speed signal 142 is a signal proportional to revolutional speed of the front left wheel 1L. This signal can be obtained by means which is similar to means for generating the above mentioned crank angle signal 120. That is, it is obtained by performing a computation on a cycle or frequency of pulse signal generated by the sensor 29 and inputted by the electric path 31. The right wheel revolution speed signal 143 is a signal proportional to revolution speed of the front right wheel 1R and pulse signal generated by the sensor 30 and inputted by the electric path 32. The revolution speed is obtained by performing computations on a cycle or frequency of the pulse signal. The rear left wheel revolution speed 144 is a signal proportional to revolution speed of the rear left wheel (left driving wheel) 2L and pulse signal generated by the sensor 33 and inputted by the electric path 35. The revolution speed is obtained by performing computation on a cycle or frequency of the pulse signal. The rear right wheel revolution speed signal 145 is a signal proportional to revolution speed of the rear right wheel (right driving wheel) 2R and pulse signal generated by the sensor 34 and inputted by the electric path 36. The revolution speed is obtained by performing computation on a cycle or frequency of the pulse signal. Since an average revolution speed between the rear left and right wheels 2L, 2R corresponds to revolution speed of the output shaft of the transmission 2, the output shaft revolution speed 140 may be obtained in terms of the average between the rear left and right wheel revolution speed signals 144, 145.

Hereinafter, output signals are described. The power source relay control signal 201 is provided to effect ON/OFF control of the power source relay 17 such that when the engine is in operation where the ignition switch 10 is placed to an ON or START position, the power source relay 17 is turned ON, connecting the main power source 107 from the battery 15 via this power source relay 17 to the control unit 1000. The power source relay 17 is kept closed even after the ignition switch 10 has been turned OFF until saving of the data is completed, keeping the connection of the main power source 107 to the control unit 1000. The data output signal 202 is delivered via the electric path 27 to the display 28, causing same to display a reduction ratio established in the transmission 4, a range selected by the select lever 14, and a result of diagnosis of the power train control system. One example of this data output signal 202 is described in Laid-open Japanese Patent Application No. 58-13140 where the data input signal 106 is also described.

An air flow control signal 220 is a throttle opening degree instruction corresponding to the accelerator signal 103 or a corrected throttle opening degree instruction which results from correcting the first mentioned basic instruction with various information. This signal 220 is supplied via the wire harness 23 to the well known throttle actuator (for example, see Published Japanese Patent Application No. 58-25853). The throttle actuator is mounted to the engine 3 adjusts the throttle opening degree to a level corresponding to the depression degree information (accelerator signal 103) of the accelerator pedal 11, thereby to adjust the air flow rate admitted to the engine 3 to a value corresponding to the air flow control signal 220. In the case the air flow control signal is the above mentioned corrected throttle opening degree instruction, the engine throttle opening degree is caused to be adjusted to a value corresponding to this corrected instruction. The air flow control signal 220 adjusts the throttle opening degree via the throttle actuator so as to keep the idle revolution speed constant in a manner as described in Laid-open Japanese Patent Application No. 55-160137. When the data input signal 106 calls for a constant cruising speed, the air flow control signal 220 adjusts, via the throttle actuator, the throttle opening degree based on a result of comparison of a measured vehicle speed with an instructed vehicle speed value (a feedback control) in order to cause the vehicle to run at the instructed vehicle speed value. The fuel injection control signal 221 is a pulse signal which controls the opening time of a fuel injection valve mounted to the engine, which signal is delivered from the control unit 1000 via the wire harness 23. As described in Laid-open Japanese Patent Application No. 55-125334, a basic control concept is that the above mentioned valve opening time duration (fuel injection amount), which is proportional to the intake air flow rate, is computed on the crank angle signal 120 and the air flow signal 122, and then this result is corrected in various manners, and the result is output in terms of the fuel injection control signal 221 in synchronism with the operation of the engine 3. As described in Laid-open Japanese Patent Application Nos. 57-185501 and 54-58116, the ignition control signal 222 is a signal which controls the ignition energy and the ignition timing by controlling in synchronism with the crank angle signal 120, the time during which current is allowed to pass through a primary coil of an ignition coil provided to the engine 3 and the termination timing of the current supply. This signal is delivered from the control unit 1000 via the wire harness 23. The ignition energy is controlled such that it is kept unchanged with a variation in the engine revolution speed (the cycle or the frequency of the crank angle signal 120) and a variation in the voltage of the battery 15, and the ignition timing is determined on the engine revolution speed and crankshaft torque taking the output torque, fuel economy and exhaust gases into account. As described in Laid-open Japanese Patent Application No. 55-32918, the EGR control signal 223 is a signal relating to the opening degree of an exhaust gas recirculation valve (exhaust gas recirculation rate), which signal is delivered from the control unit 1000 via the wire harness 23. The EGR valve opening as mentioned above is determined based on the engine revolution speed and the crankshaft torque taking the exhaust gas and fuel economy into account.

A reduction ratio control signal 240 is a signal corresponding to a reduction ratio (gear position) established in the transmission 4 and delivered from the control unit 1000 via the wire harness 24. The reduction ratio is determined based on the input torque to the transmission (the engine crankshaft torque), i.e., the signal 121 or the signal (accelerator signal 103, intake air flow signal 122) corresponding to this signal 121, and the vehicle speed (output shaft revolution speed signal 140) taking driving torque, fuel economy vibrations into account. As described in Laid-open Japanese Patent Application Nos. 57-47056, 56-24255 and 56-24256, the reduction ratio control signal 240 controls various kinds of shift solenoids of the transmission 4 in order to establish the desired gear position. The lock-up control signal 241 is a signal which controls connection and disconnection between the input and output elements of the torque converter in the transmission 4 and delivered from the control unit 1000 via the wire harness 24. As described in Laid-open Japanese Patent Application Nos. 56-24255, 56-24256, and 57-33253, the lock-up control signal 241 is determined on the crankshaft torque (signal 121) and the vehicle speed (signal 140) taking the fuel economy and vibrations into account in order to control the above mentioned connection or if desired a relative rotation (slip) between the input and output elements of the torque converter.

Figure 3:
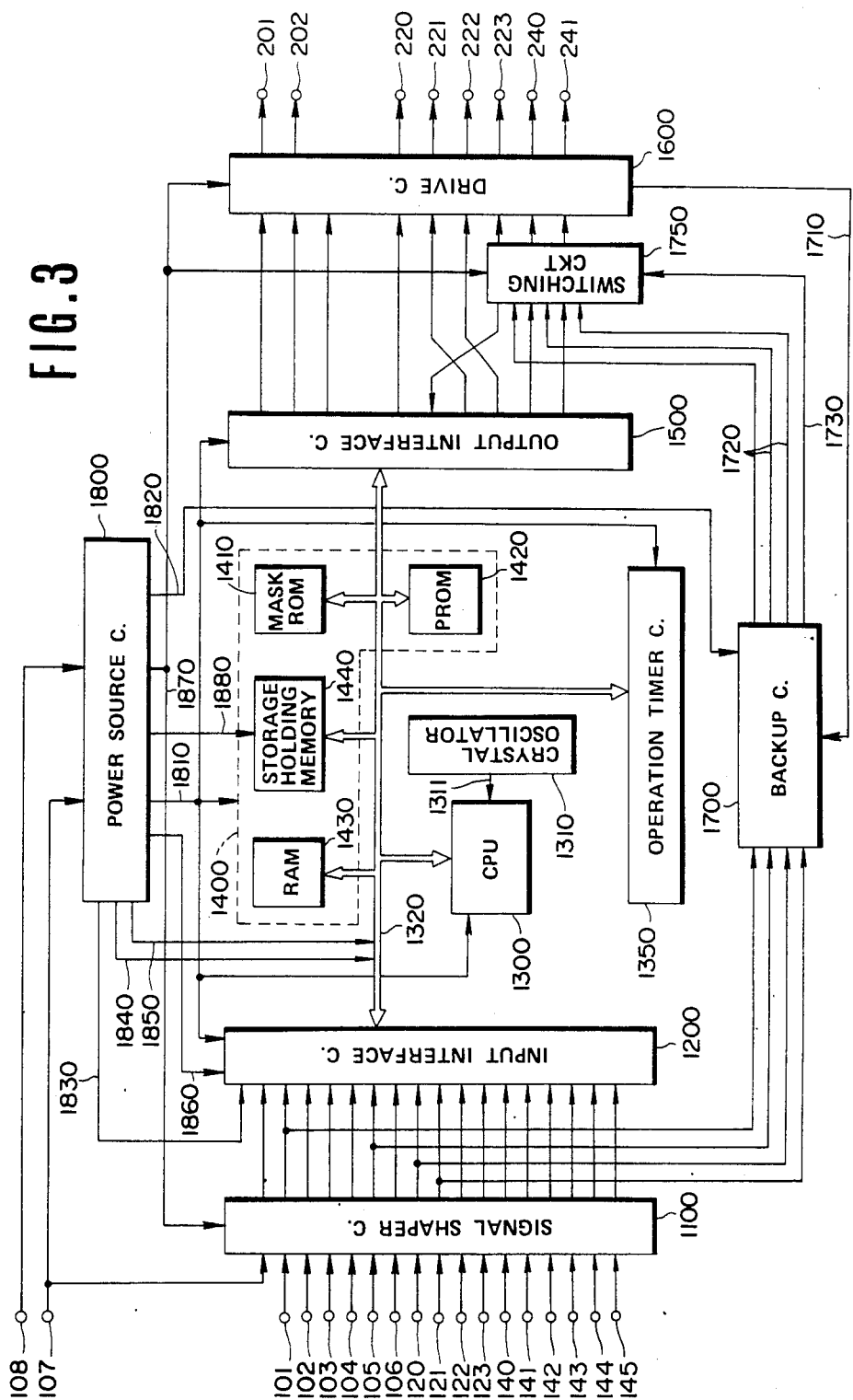
FIG. 3 is a detailed block diagram of the control unit.
Figure 4:
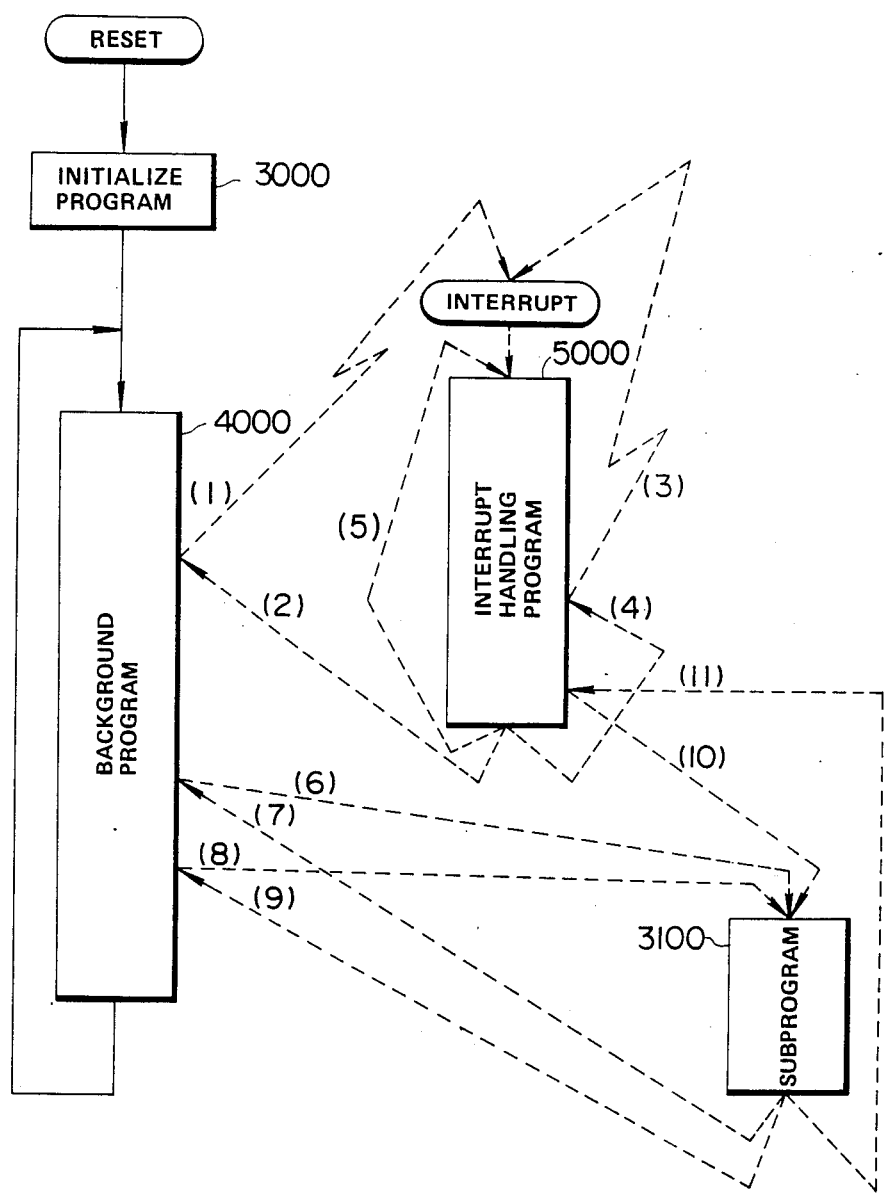
FIG. 4 illustrates a control concept carried out by the control unit.

Hereinafter, referring to FIG. 3, a practical example of the architecture of the control unit 1000 is described.

In this Figure, 1100 designates a signal shaper circuit which forms an input portion of the before mentioned various input signals 101 to 107, 120 to 123, 140, 141. If functions to eliminate noise of these input signals and absorbs surge thereof so as to prevent malfunction of the control unit 1000 caused by noise and destruction thereof caused by surge. It also performs amplification of the various input signals and conversion thereof so as to shape these signals, thereby to allow input interface circuit 1200 to accurately operate. The input interface circuit 1200 effects analog to digital (A/D) conversion of the various input signals which have been shaped by the circuit 1100, counts pulses for a predetermined time, converts these signals into digital coded signals which can be read as input data by a central processing unit (CPU) 1300 and stores them into the corresponding internal registers. The CPU 1300 operates in synchronous with a clock signal generated based on an oscillating signal generated by a crystal oscillator 1310. The CPU 1300 is connected via a bus 1320 to the input interface circuit 1200, a memory 1400, an output interface circuit 1500 and an operation timer circuit 1350. When, in operation, it executes a control program stored in a mask ROM 1410 and a PROM 1420 of the memory 1400, the CPU 1300 reads various input data from the corresponding registers within the input interface circuit 1200, performs arithmetic operations on these input data to generate various output data, delivers these output data to the corresponding registers within the output interface circuit 1500 with a predetermined timing. The memory 1400 is a storage device including in addition to the above mentioned mask ROM 1410 and the ROM 1420, a RAM 1430 and a storage holding memory 1440. The mask ROM 1410 is used to permanently store control programs and data used in executing the programs. The PROM 1420 is used to permanently store vehicle speed values, and control programs which are subject to alteration depending upon the type of engine 3 and the transmission 4. The RAM 1430 is a random access memory which is able to read and write data and is used to temporarily store intermediate data resulting from arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected as when the ignition switch 10 is turned OFF. The storage holding memory 1440 is used to store such data as those intermediate data and final data of the arithmetic operations executed by the CPU 1300 which are to be held even after the automotive vehicle stops its operation, and it can hold the above mentioned data owing to the continuously connected power source 108 even after the main power source 107 is disconnected as when the ignition switch 10 is turned OFF.

The operation timer circuit 1350 is provided to reinforce the facilitates of the CPU 1300. It comprises a multiplication circuit for fast processing in the CPU 1300, an interval timer for causing an interrupt signal upon elapse of a predetermined time and a free-running counter used for measuring a time elapsed in the CPU 1300 for effecting a shift from a predetermined event to a next event and measuring the instant when the event takes place. The output interface circuit 1500 stores the output data from the CPU 1300 into the corresponding internal registers. It converts these data into pulse signals or into switching signals which go into "1" or "0" before delivering them to a drive circuit 1600. The drive circuit 1600 is a power amplifier circuit which performs voltage or current amplification of the signals from the output interface circuit 1500 so as to produce the before mentioned various output signals 201, 202, 220 to 223, 240, 241.

Designated by 1700 is a backup circuit which is activated by a monitor signal 1710 caused by monitoring the signals produced by the drive circuit 1600. When it is activated indicating that the CPU 1300 or the memory 1400 has failed to normally operate due to trouble, the backup circuit 1700 receives a portion of the signals from the signal shaper circuit 1100 and generates output signals 1720 which enables the engine 3 and the transmission 4 to continue operating so that the automotive vehicle can continue running, and it also generates a switching signal 1730 informing the operator of occurrence of trouble. The signals 1720 and 1730 are supplied to a switching circuit 1750, causing the switching circuit 1750 to cut off signals from the output interface circuit 1500 and to supply in lieu thereof the signals 1720 from the backup circuit 1700 to the drive circuit 1600, thereby to enable the automotive vehicle to be safely driven to an auto repair shop.

Designated by 1800 is a power source circuit which is supplied with the main power source 107 and the continuously connected power source 108. The power source circuit 1800 supplies a constant voltage 1810 of 5 V from the main power source 107 to the input interface circuit 1200, CPU 1300, memory 1400, output interface circuit 1500 and operation timer circuit 1350. It also supplies another constant voltage 1820 of 5 V to the backup circuit 1700, a signal 1830 indicative of "ON" or "OFF" state of the ignition switch 10 to the input interface circuit 1200, a reset signal 1840 and a stop signal 1850 for stopping the operation of the CPU 1300 to the bus 1320, a constant voltage 1860 for the internal A/D converter to the input interface circuit 1200, and a main voltage 1870 to the signal shaper circuit 1100, drive circuit 1600 and switching circuit 1750. Besides, the power source circuit 1800 supplies a constant voltage 1800 of 5 V from the continuously connected power source 108 to the storage holding memory 1440 for enabling same to operate even after the ignition switch 10 has been turned OFF.

Figure 5:
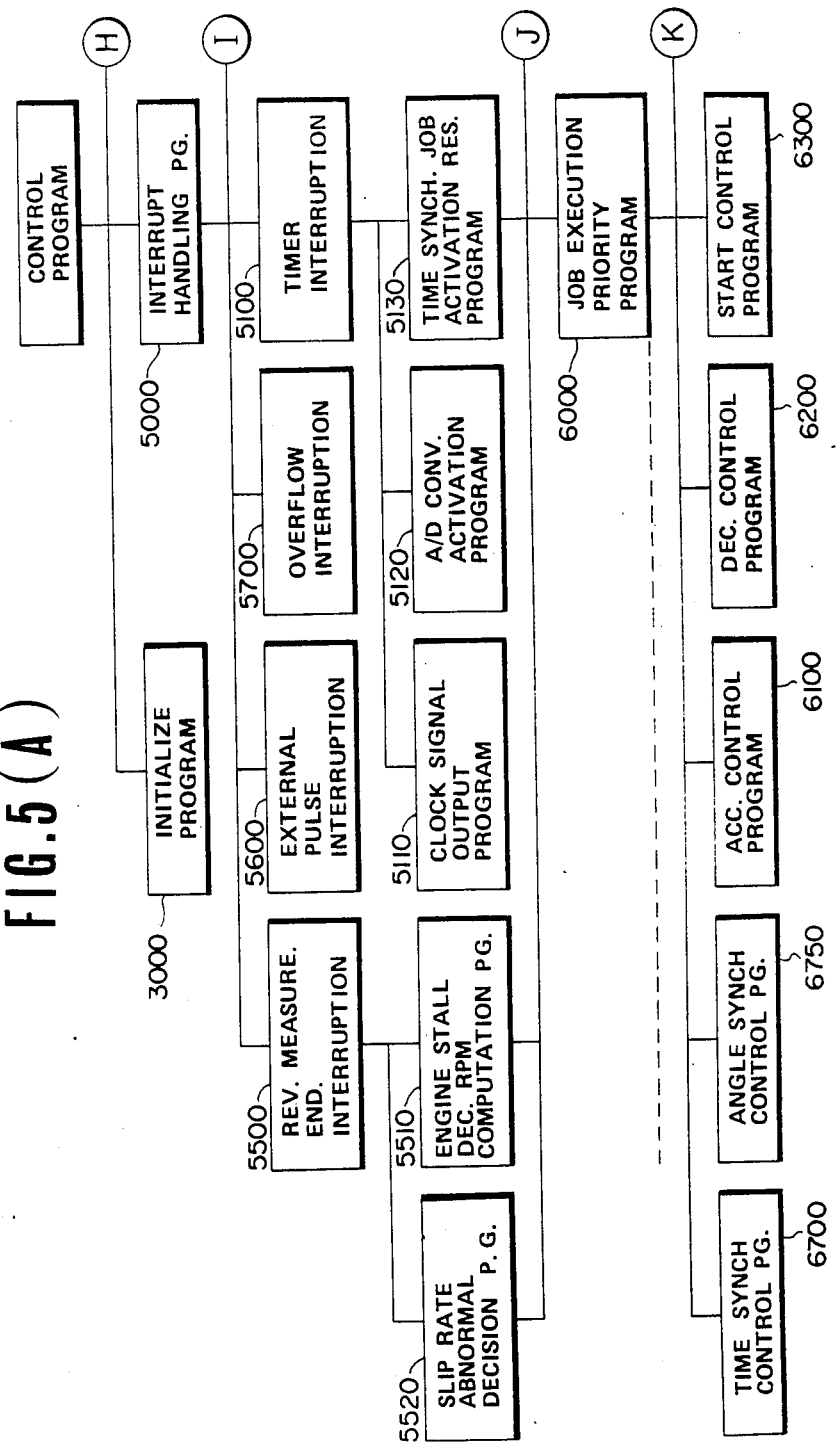
FIGS. 5(A) and 5(B), when combined, illustrate in detail the control relationship among programs stored in the control unit.
Figure 5B:
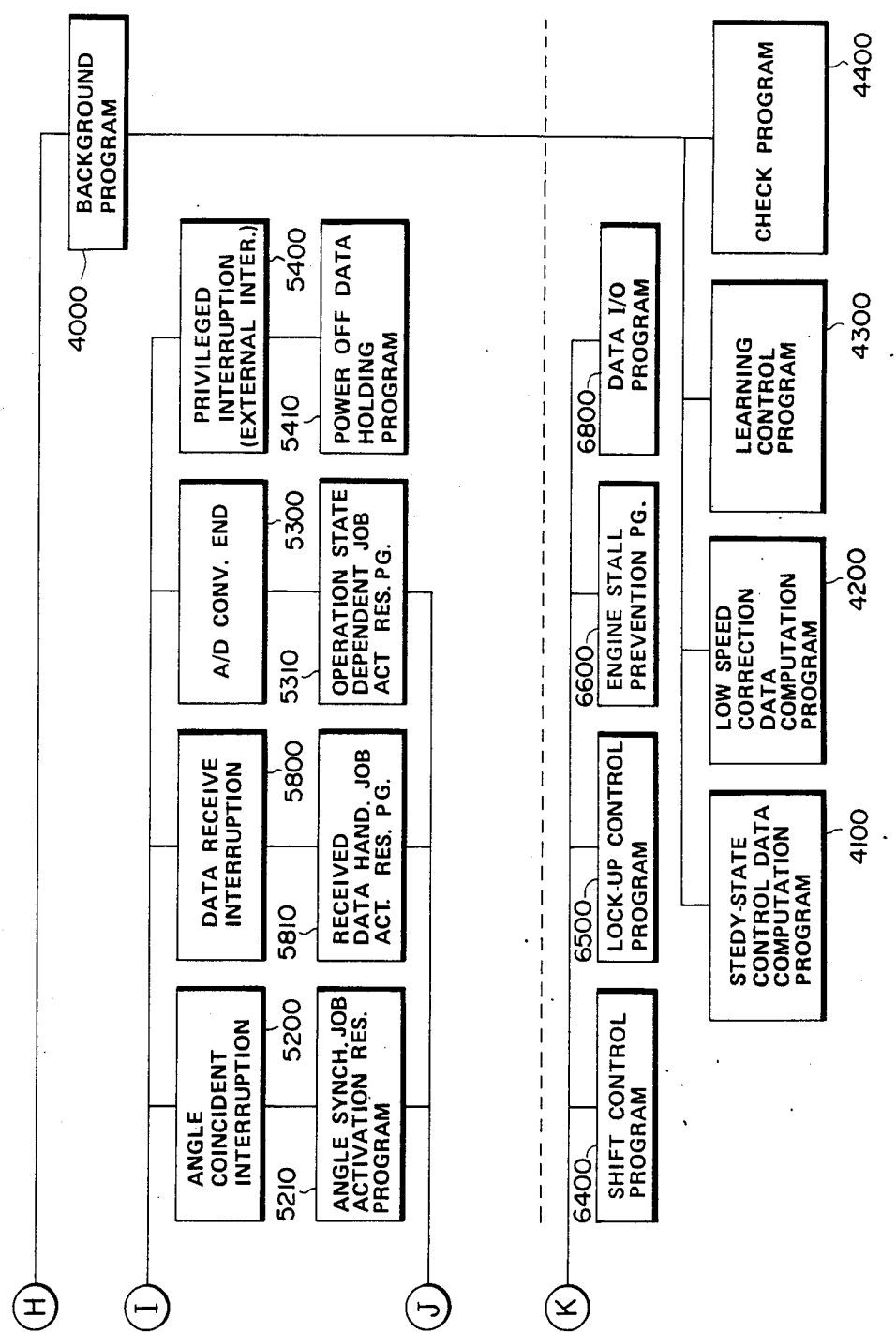

The detail of the control programs are illustrated in FIGS. 5A and 5B which are hereinafter used in the detail description of the control programs.

When the ignition switch 10 is turned ON and the main power source 107 is connected, the reset signal 1840 is generated, causing the initialize program 3000 to run from a specified address called "reset vector address." The initialize program 3000 is executed to prepare arrangements for execution of various programs which follow by setting initial values in the CPU 1300, RAM 1430, input/output interface circuits 1200, 1500 (initializing). With this program, all of the locations in the RAM to be used by this microcomputer are cleared, and all of the instructions necessary for operation of the input and output interface circuits 1200, 1500 and the operation timer circuit 1350 are issued. These instructions include an instruction to release an instruction mask for handling interruption signals, an instruction to set the frequency of timer interruption, an instruction to set a measuring time for measuring each of various revolution speeds and a vehicle speed, an instruction to set a constant or constants relating to each of the output signals for the various controls, and an instruction to set an initial state of each of the outputs. After initialization, an instruction authorizing an interruption is issued to the CPU 1300.

The execution of the background program 4000 continues during the normal operation of the CPU 1300, i.e., the operation of the CPU 1300 when there is no interruption requirement. With the background program group 4000, jobs which require less emergency are executed when the CPU 1300 is free, such as jobs requiring long operation time and jobs computing steady-state control constants. The background program group 4000 includes a steady-state control data computation program 4100, a low speed correction data computation program 4200, a learning control program 4300 and a check program 4400. These programs are executed sequentially in a predetermined order such that the top program is executed again after the execution of the bottom program and this cycle is repeated. In this manner, the control unit 1000 continues to generate the output signals 201, 202, 220 to 223, 240, 241 during the steady state operation of the automotive vehicle. The signals 220 to 223 control the engine 3, and the signals 240, 241 control the transmission 4 so as to adjust the engine 3 and the transmission 4 to maintain the steady state operation of the automotive vehicle. The signal 201 holds the power source relay 17 in an ON state so as to maintained connection to the main power source 107, and the signal 202 causes the display 28 to display necessary information.

The interrupt handling program group 5000 is caused to run by an interruption of the execution of the background program group 4000 (or the initialize program 3000 if desired). The interrupt handling program group 5000 comprises a timer interrupt handling program 5100, (5110, 5120, 5130) an angle coincident interrupt handling program 5200 (5210), and A/D conversion handling program 5300 (5310), an external interruption (or a privileged interruption) handling program 5400 (5410), a revolution measurement end interruption handling program 5500 (5510, 5520), an external pulse interruption handling program 5600, an overflow interruption handling program 5700, and a data receive interruption handling program 5800 (5810) which are caused to be executed by the corresponding interruptions. It also includes a group of priority-basis-executing programs which are executed based on priority which is decided by a job execution priority decision program 6000, which group of programs includes an acceleration control program 6100, a deceleration control program 6200, a start control program 6300, a shift control program 6400, a lock-up control program 6500, an engine stall prevention program 6600, a time synchronizing control program 6700, an angle synchronizing control program 6750 and a data input-output program 6800.

Describing these programs subsequently, entry of a timer interrupt causes a selection of the timer interruption program 5100 where the A/D conversion activation program 5120 is executed. This program 5120 manages the measurement of analog input signals by activating the A/D converter and switching the multiplexer in effecting the A/D conversion of the analog input signals for use in the subsequent control by switching the multiplexer. Then, the clock signal output program 5110 is executed. This program generates a clock signal with a predetermined cycle which indicates normal operation of each of the CPU 1300, memory 1400, output interface circuit 1500, and thus informs the operating state of each of them. Finally, time synchronizing job activation reservation program 5130 is executed and places an activation of a time synchronizing control program 6700 (i.e., an activation requirement of this program) in the job execution priority program 6000. The time synchronizing control program processes jobs to be carried out in synchronous with the clock signal.

Entry of an angle coincidence interruption (i.e., an interruption which occurs whenever the engine assumes a predetermined crank angle) causes the selection of the angle coincident interruption handling program 5200. This program causes an angle synchronizing job activation reservation program 5210 to place the activation (i.e., the activation requirement) of a job handling program (an angle synchronizing control program 6750) which needs to be processed in synchronous with the revolution of the engine on the job execution priority decision program 6000.

Entry of an A/D BUSSY flag check interruption causes a selection of the A/D conversion end handling program 5300 where a decision is made on checking the A/D BUSSY flag whether or not the A/D conversion has ended. When it has ended, an operation state dependent job activation reservation program 5310 instructs the storage of A/D converted data into the corresponding location in the RAM 1430 in accordance with A/D conversion channel data, and although this will be specifically described later, it decides the operation state of the automotive vehicle on a time series data of the A/D converted values relating to the acceleration signal 103 and places the activation requirement of an appropriate operation state dependent job handling program for this operating state (such as the acceleration control program, deceleration control program and start control program) on and job execution priority decision program 6000.

Entry of an external interruption causes a selection of the external interruption handling program 5400. The external interruption, i.e., an emergency interruption, is generated when the main power source 107 is disconnected. The program 5400 is selected by entry of this interruption. This program 5400 causes the execution of a power off data holding program 5410 where data to be preserved for control purposes and the like are moved from the RAM 1430 to the storage holding memory 1440.

Figure 8:
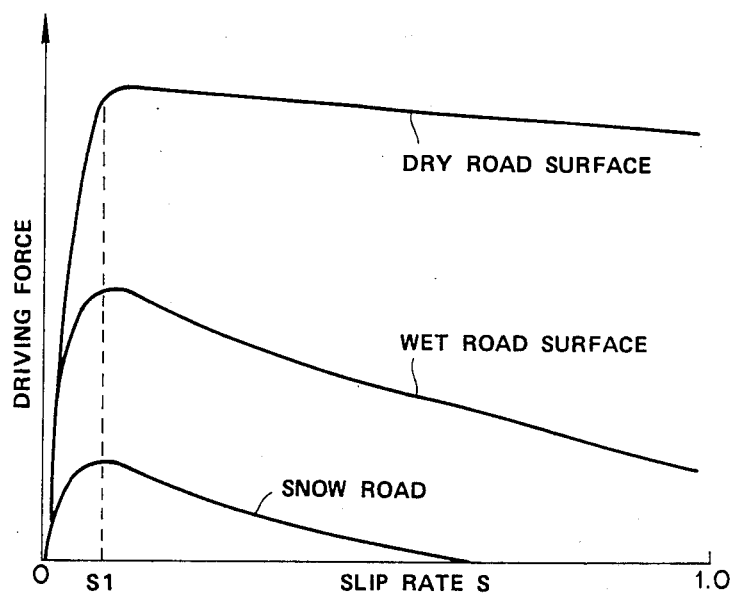
FIG. 8 is a graph showing driving force vs. slip rate characteristic curves for different road conditions.

Entry of engine revolution measurement end interruption or wheel revolution speed measurement end interruption causes a selection of the revolution measurement end interruption handling program 5500. This program is activated after completion of each of measurements conducted by a circuit, provided in the input interface circuit 1200, which measures (counts the number of incoming pulses during a predetermined period) a frequency of each of the wheel revolution speeds 142 to 145 or the crank angle signal 120. After completion of measurement of the engine revolution speed (crank angle signal 120), the engine stall decision rpm computation program 5510 is activated which reads engine revolution speed and decides whether or not the engine may stall. When the decision is positive, requirement for activation of the engine stall prevention program 6000 is reserved in the job execution priority decision program 6000. After completion of measurement of the wheel revolution speed signal (signals 142 to 145), the slip rate abnormal decision program 5520 is activated which decides whether or not a slip rate S, which is given in a manner described later, deviates from a target value (for example S1 in FIG. 8). When the decision is positive, i.e., there is the deviation, requirement for activation of the start control program 6300 in the case of start-up or that of acceleration control program 6100 in the case of acceleration is reserved in the job execution priority decision program 6000.

The external pulse interruption handling program 5600 is caused to be executed upon manipulation of a key on a keyboard or entry of a pulse signal from an external device. This program causes execution of a corresponding control to the pulse signal. The overflow interruption handling program 5700 is caused to be executed by entry of an interruption which is generated upon overflow of the timer and performs a predetermined process.

The data receive interruption handling program 5800 is caused to be executed by entry of a data receive interruption and causes the execution of the received data handling job activation program 5810. With the execution of this program 5810, the received data is stored at a predetermined location in the RAM 1430 and then the activation of the received data handling job (i.e., the requirement for the activation thereof) is placed on the job execution priority program 6000.

The job execution priority decision program 6000 receives the various activation requirements of job handling programs selected by the above mentioned interrupt handling programs and causes the contents of the corresponding bits (flags) in the RAM 1430 to the selected job programs to go from "0" to "1". Since a predetermined execution priority level is originally allocated to each job program, the sequence of location and bit for each job program is determined in accordance with the predetermined priority level. In the case of this program, a check is made starting with the high-order bit, sequentially down to the low-order bit in a location in the RAM 1430, and when a program is reserved, this program is executed and the reservation indicator is cancelled (by resetting the flag to "0"). When the execution of this program ends, the JOB execution priority decision program 6000 is executed and a reserved program of the next lower priority level is caused to be executed and the reservation therefor is cancelled, and after the execution of all of the reserved programs has ended, switching to the background program 4000 occurs.

Hereinafter, a group of those job programs which are to be executed on the priority determined by the program 6000 are described. The acceleration control program 6100 computes output control data relating to optimal fuel injection amount, ignition timing, exhaust gas recirculation flow rate, intake air flow rate, and reduction ratio and lock-up schedule for the degree of acceleration. For example, in the case of a rapid acceleration (i.e., in the case of rapid increase in the accelerator signal 103), they are controlled such that for increasing the output of the engine, the fuel injection amount is increased, the ignition timing is advanced, the EGR flow rate is reduced and the intake air flow rate is increased, and in addition to increasing the output torque from the transmission 4, the lock-up of the torque converter is released and the reduction ratio is increased. When, at acceleration, the slip rate is higher than the target value, the engine 3 is caused to reduce its output torque such as by correcting the air flow control signal 220, whereas when the slip rate is lower than the target value, the engine 3 is caused to increase its output torque by correcting the air flow control signal 220.

A deceleration control program 6200 computes, at deceleration, various control output data which are optimal for the degree of deceleration, vehicle speed and engine revolution speed. At deceleration, the engine 3 is controlled such that the fuel injection amount is zero or very small and the transmission 4 is controlled such that the reduction ratio and the operating state of the torque converter cooperate with each other to provide the most appropriate deceleration feel.

The start control program 6300 computes various output data for controlling the engine 3 and the transmission 4 such that a sufficiently large starting torque is obtained when the automotive vehicle starts. When, at start-up, the slip rate is higher than the target value, the engine 3 is caused to reduce its output torque by correcting the air flow control signal 220, whereas when the slip rate is lower than the target value, the engine 3 is caused to increase its output torque by correcting the air flow control signal 220.

The shift control program 6400 computes various output data used for controlling the shift in the transmission 4 and the output torque and the revolution speed of the engine 3 in order to prevent substantial shocks from being transmitted to vehicle passengers during the shifting operation in the transmission 4.

The lock-up control program 6500 computes various output data for controlling lock-up operation of the torque converter and the output of the engine in order to reduce shocks occurring upon lock-up operation and relesese thereof.

The engine stall prevention control program 6600 is caused to be executed when it is anticipated that the engine stall tends to occur by deciding a state of variation in the engine revolution speed during the execution of said program 5510. It computes various control output data so as to control the engine 3 and the transmission 4 such that, for preventing engine stall, the engine output is increased immediately and the load is decreased.

The time synchronizing control program 6700 which is reserved and executed after lapse of each cycle, updates various data and writes the control data of the preceding cycle into the output interface circuit 1500.

The execution of an angle synchronizing program 6750, which is reserved and executed whenever the engine 3 assumes a predetermined crank angle, updates various data and writes control data into the output interface circuit 1500.

The data input/output control program 6800, which is reserved and executed upon lapse of a predetermined time or upon entry of a data receive interruption, stores the date after deciding the content thereof upon data reception, alters the state of control and outputs of the content of the data upon effecting data transmission.

The operation of the above embodiment is described in terms of how the slip rate is kept at a target value.

Entry of an interruption which is caused by completion of measurement of wheel revolution speed (signals 142 to 145) causes an abnormal slip decision program 5520 to run, which program runs along a flowchart shown in FIG. 6 to decide, in the manner as follows, whether or not the slip rate agrees to a target value based on wheel revolution speed data obtained in the input interface circuit 1200 after each measurement.

Figure 6:
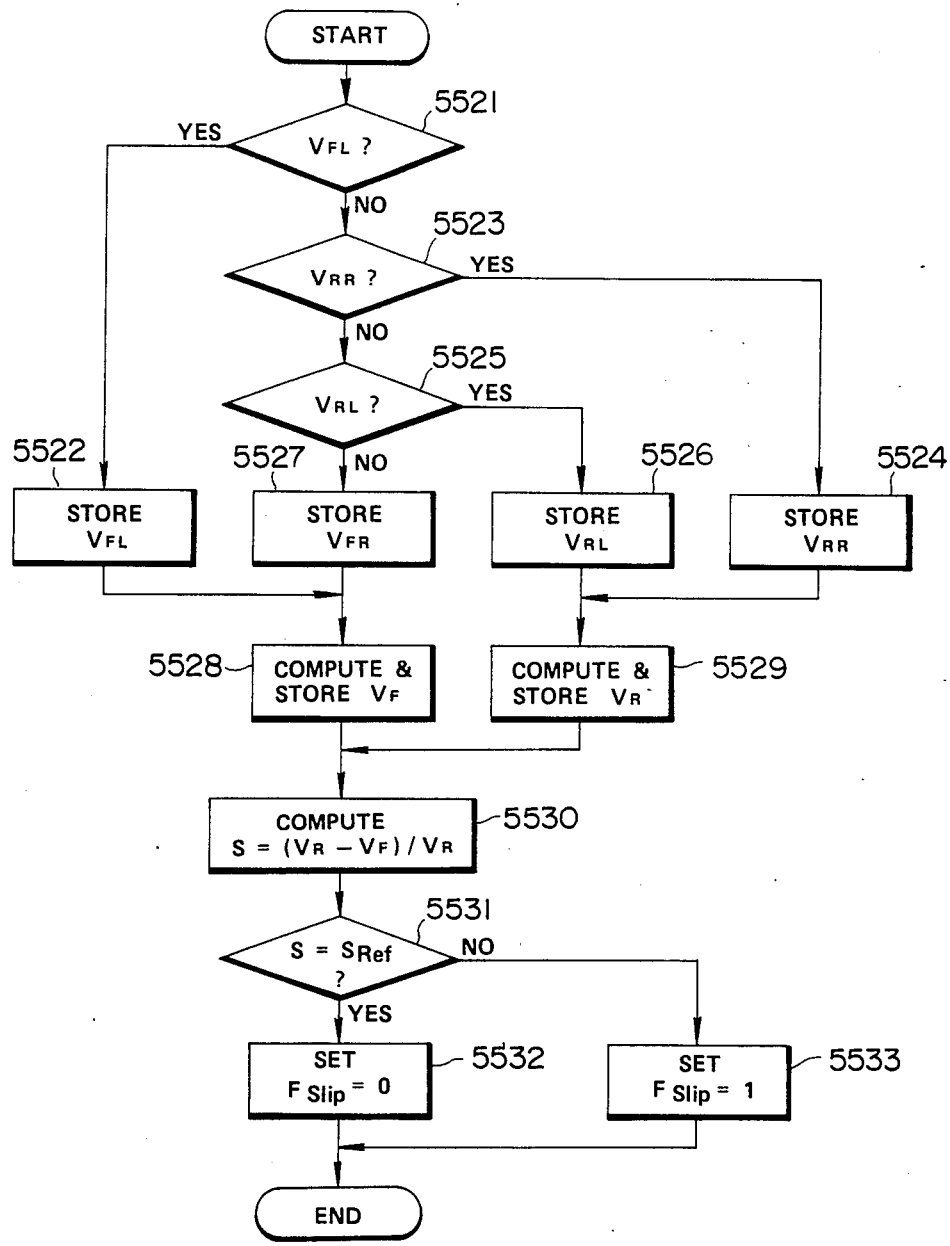
FIG. 6 is a flowchart of a slip rate abnormal decision program.

Referring to FIG. 6, a step 5521 is executed first of all where a decision is made whether or not wheel revolution speed data read by the input interface 1200 is a revolution speed of the front left wheel 1L, and when the decision is positive, a step 5522 is executed where the data is stored at a predetermined location within the RAM 1430 as a front left wheel revolution speed $V_{FL}$, whereas when the decision is negative, a step 5523 is executed. In the step 5523, a decision is made whether or not the data is a revolution speed of the rear right wheel 2R, and if the decision is positive a step 5524 is executed and this data is stored at a predetermined location within the RAM 1430 as a rear right wheel revolution speed $V_{RR}$, whereas when the decision is negative, a step 5525 is executed. In the step 5525, a decision is made whether or not this data read is a revolution speed of the rear left wheel 2L, and when the decision is positive, it is stored (step 5526) at a predetermined location in the RAM 1430 is a rear left wheel revolution speed $V_{RL}$, whereas when the decision is negative, a step 5527 is executed where the data is stored at a predetermined location within the RAM 1430 as a revolution speed of the front right wheel $V_{FR}$ of the front right wheel 1R. Based on the wheel revolution speed data $V_{FL}$, $V_{FR}$, $V_{RL}$ and $V_{RR}$ stored in the RAM 1430, the CPU 1300 computes in a step 5528 an average revolution speed (an average peripheral speed) $V_F$ between the revolution speeds of the front two wheels 1L and 1R, i.e., a ground speed of the vehicle, and stores the result at a predetermined location in the RAM 1430. The CPU 1300 computes in a step 5529 an average revolution speed (an average peripheral speed) $V_R$ between the revolution speeds of the rear two wheels 2L and 2R based on the data $V_{RL}$ and $V_{RR}$ and stores the result at a predetermined location in the RAM 1430. In a step 5530, a slip rate S is obtained by performing computation of an equation expressed by $S=(V_R-V_F)/V_R$, and in the subsequent step 5531 a decision is made whether or not the slip rate S thus obtained is equal to a target slip rate $S_{Ref}$ (for example, S1 in FIG. 8). The slip rate S is expressed by an equation $S=(V_F-V_R)/V_F$ in the case of a front wheel driven car.

After the step 5531, a step 5532 is executed when $S=S_{Ref}$, while a step 5533 is executed when $S \neq S_{Ref}$. In the step 5532, the slip rate abnormal flag $F_{Slip}$ is reset to "0" because the slip rate S is equal to $S_{Ref}$, whereas in the step 5533, the slip rate abnormal flag $F_{Slip}$ is set to "1" because the slip rate S deviates from the target value $S_{Ref}$. The flat $F_{Slip}$ set in the above mentioned manner is used as a requirement for activation of the start control program 6300 or the acceleration control program 6100, and it is reserved in the job execution priority decision program 6000.

Figure 7:
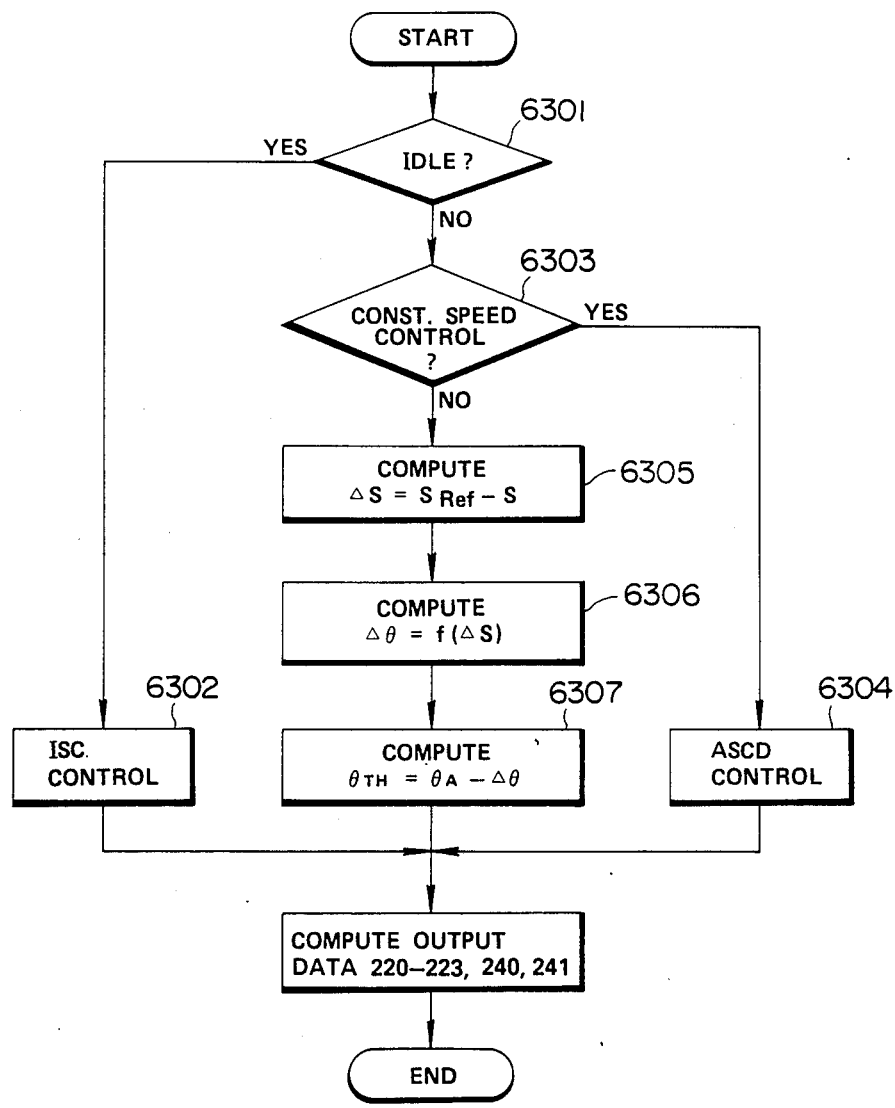
FIG. 7 is a flowchart of a start control program.

When the abnormal state of the slip rate occurs at start-up, the program 6000 initiates the execution of the start control program 6300 when its turn comes and resets the flag $F_{Slip}$ to "0". The program 6300 proceeds along a flowchart shown in FIG. 7. First, a step 6301 is executed where a decision is made based on the select signal 102, accelerator signal 103, wheel revolution speed signals 142 to 145 whether or not the engine is idling. When the decision is positive, a step 6302 is executed where an engine revolution speed control at engine idle operation (ISC control) is carried out to cause the throttle actuator to keep the revolution speed of the engine 3 at a constant idle revolution speed. This control is described in Laid-open Japanese Patent Application No. 55-160137. If not in the idle state, a step 6303 is executed where a data check on the data input signal 106 is performed to decide whether or not a constant speed running is instructed. When the decision is positive, a well known constant speed running control (ASCD control) is carried out in a step 6304, causing the vehicle to travel at the constant speed by controlling the throttle actuator.

When the decision determines that constant speed running is not instructed, the control proceeds along steps 6305 to 6307 sequentially where the slip rate S is adjusted to the target slip rate $S_{Ref}$ which will be described hereinafter. In the step 6305, a deviation of $\Delta S$ is computed by equation $\Delta S = S_{Ref}-S$. In the subsequent step 6306, a throttle opening degree correction data $\Delta\theta$ is given as a function of this deviation $\Delta S$. In the step 6307, the correction data $\Delta\theta$ is subtracted from the throttle opening degree $\theta_A$ (basic throttle opening degree instruction) which corresponds to the accelerator signal 103 to give a corrected throttle opening degree instruction $\theta_{TH}$ and generates it in terms of air flow control signal 220. The air flow control signal 220 is decreased to cause the engine 3 to reduce its output torque when the slip rate S is greater than the target value $S_{Ref}$, thus causing the slip rate S to decrease down to the target value $S_{Ref}$. When the slip rate S is less than the target value $S_{Ref}$, the air flow control signal 220 is increased to cause the engine to increase its output torque, thus causing the slip rate S to increase up to the target value $S_{Ref}$.

When the abnormal state of the slip rate occurs at acceleration, the program 6000 initiates the execution of the acceleration control program 6100 when its turn comes and resets the flag $F_{Slip}$ to "0". This program 6100 is substantially similar to the start control program 6300-except the former does not include the ISC control, and it is able to cause the slip rate S to be maintained at the target value $S_{Ref}$ like the program which is executed at start-up.

Although, in the above described embodiment, in giving the slip rate S, the average revolution speed between the front two wheels and the average revolution speed of the rear two wheels (driving wheel) have been used, the slip rate S may be obtained from the maximum and minimum values among the revolution speeds of the four wheels. Although the average revolution speed between the front two wheels is used in detecting a ground speed of the vehicle, the ground speed may be detected by using radar. Besides, although the air flow (throttle opening degree) is connected to increase/decrease the output torque of the engine in order to cause the slip rate S to be kept at the target value $S_{Ref}$ when the former deviates from the latter, instead of correcting the air flow, the fuel injection rate (sinal 221) of the engine or the ignition timing (signal 222) may be corrected, or the reduction ratio (signal 240) of the transmission 4 may be corrected, or any combination of these corrections is possible. If the correction of the reduction ratio of the transmission 4 is to be used, it is preferable to combine this correction with the control of the engine because the torque control would be step-like with the reduction ratio control only. However, if the transmission 4 is a continuously variable stepless transmission, the control of the transmission 4 along is acceptable.

It is desired that the above mentioned slip control be suspended during a transitional period such as when the engine 3 is about to stall or the transmission 4 undergoes shifting or the torque converter undergoes a lock-up control. In order to detect these transitional periods, a change pattern of the accelerator signal 102 or that of the crank angle sensor 120 (engine revolution speed) or the degree of variation in output shaft revolution speed signal 140 (vehicle speed) should be monitored. During the transitional periods of the vehicle, a series of steps 6305, 6306 and 6307 where the slip control is carried out should be skipped in the case of FIG. 7.

It will now be understood that since the output torque of the power train is feedback controlled so as to keep the slip rate S at the target value $S_{Ref}$ (S1 in the case of FIG. 8), the driving force of the vehicle can be made maximum while securely preventing the vehicle from slipping, thus causing the vehicle to quickly start or accelerate without any slip of the wheels. Besides, since the output of the power train is effectively converted into the driving force, the fuel economy has been enhanced.

Since, as described above, the slip control is carried out only where it is required, such as when the vehicle starts or accelerates, a problem that the performance of the power train would drop outside of these operation periods if the slip control were carried out has been eliminated.

What is claimed is:

1. A method of controlling an automotive vehicle having a driving wheel driven by a power train and a non-driving wheel, the power train including an engine and a transmission, the method comprising the steps of:

detecting a peripheral speed of the driving wheel and generating a first peripheral speed indicative signal indicative of said peripheral speed of the driving wheel;

detecting a peripheral speed of the non-driving wheel and generating a second peripheral speed indicative signal indicative of said peripheral speed of the non-driving wheel;

determining a ratio of a difference between said first and second peripheral speed indicative signals to said first peripheral speed indicative signal and generating a slip rate indicative signal indicative of the value of said determined ratio;

determining from the slip rate indicative signal a deviation of the value of said determined ratio from a predetermined target slip rate value and generating a deviation indicative signal indicative of said determined deviation; and controlling the power train in response to said deviation indicative signal such that an output torque produced by the power train is varied in a direction as to decrease said deviation indicative signal toward zero whereby said indicative value of said slip rate indicative signal is kept at said predetermined target slip rate value, wherein said controlling step comprises the steps of:

causing the power train to increase the output torque produced thereby when said deviation indicative signal indicates that the indicative value of said slip rate indicative signal is lower than predetermined target slip rate value; and causing the power train to decrease the output torque produced thereby when said deviation indicative signal indicates that the indicative value of said slip rate indicative signal is higher than said predetermined target slip rate value.

2. A method as claimed in claim 1, wherein said controlling step is executed during a predetermined operational condition of the automotive vehicle.

* * * * *